Sept. 12, 1950 W. M. SMITH 2,522,313
THERMOSTATIC CONTROL FOR AIR MOTORS
Filed July 26, 1946
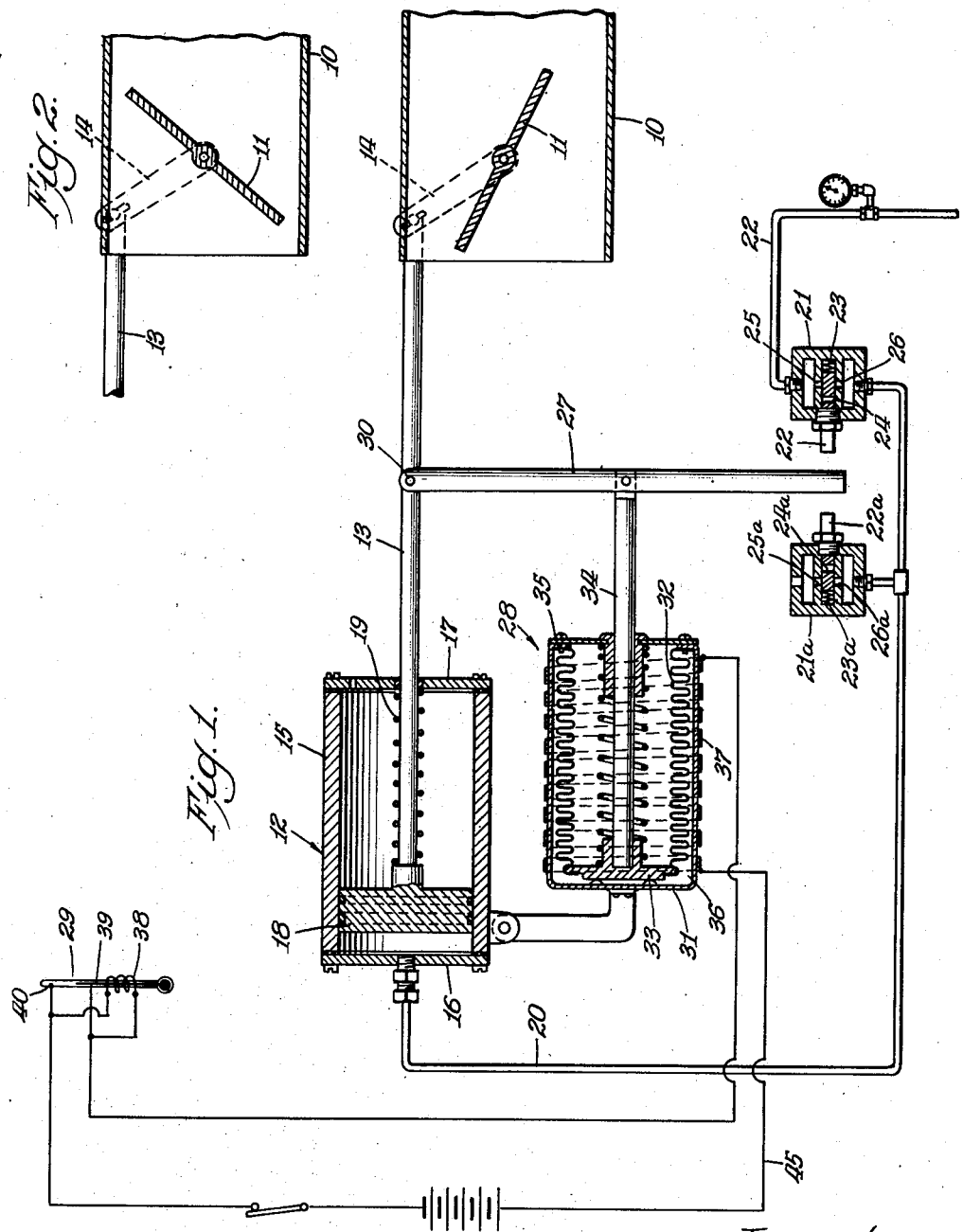
Inventor.
William M. Smith
By
Harvey M. Gillespie
Atty.

Patented Sept. 12, 1950

2,522,313

UNITED STATES PATENT OFFICE 2,522,313

THERMOSTATIC CONTROL FOR AIR MOTORS

William M. Smith, Glen Ellyn, Ill., assignor, by mesne assignments, to Vapor Heating Corporation, a corporation of Delaware Application July 26, 1946, Serial No. 686,343

2 Claims. (Cl. 236—68)

This invention relates to apparatus for controlling the operation of a fluid actuated motor.

A principal object of the invention is to provide apparatus of simple construction for controlling the direction and the extent of movement of a fluid actuated motor, whereby the motor may be operated in either forward or reversed directions by a series of intermittent movements.

Another object of the invention is to provide a control apparatus of the above general character in which the operation of a fluid actuated motor may be controlled, both as to its direction and extent of movement in response to temperature changes within an enclosed space.

A further and more specific object of the invention is to provide, in a temperature control system, a fluid pressure motor for controlling the supply of heat to an enclosed space and to control the operation of the motor by thermostatic means which is responsive to temperature changes within the enclosed space whose temperature is being controlled.

The invention is illustrated in the accompanying drawing as an apparatus for controlling the temperature of an enclosed space. It is especially suited for this purpose and therefore is illustrated in connection with a means for altering the temperature of the space. However, it is not limited to the particular use illustrated, but may be used to an advantage in other situations where a thermostatic control of a fluid pressure motor may be desirable.

In the drawing:

Fig. 1 illustrates the invention in connection with a temperature altering means adapted to deliver heat into an enclosed space, and Fig. 2 illustrates a temperature altering means adapted to resist temperature increases in the enclosed space, as by withdrawing heat therefrom or by delivering a cooling agent into the space.

In the present illustration, the temperature altering means is shown somewhat diagrammatically in the drawing, since its specific form and construction are not important features of the invention. The said diagrammatic illustration is intended to represent any form of apparatus having a valve or ventilator for delivering heat into the temperature controlled space or for otherwise altering the temperature of the space. For the purpose of the present illustration, the said temperature altering means of Fig. 1 is shown as comprising a conduit 10, adapted to deliver heated air into the enclosed space to maintain a desired temperature therein, and a valve 11 for controlling the volume of air delivered. The valve is adjusted to various positions by the movements of a fluid pressure motor 12. For this purpose the fluid pressure motor is provided with a push rod 13, which is connected to an operating lever 14 of the valve 11. The air motor 12 is of a reciprocating type and includes a fixed cylinder 15 closed at opposite ends with removable heads 16, 17. A piston 18 is fitted within the cylinder 15 so as to move from one end thereof to the other and is connected to said push rod 13. It will be seen that movement of the piston 18 toward the head 17 of the cylinder moves the valve toward its vertical or fully closed position. A coil spring 19 is interposed between the piston 18 and the cylinder head 17 and functions to normally move the piston toward the head 16 of the cylinder when the fluid pressure between said head and piston is relieved sufficiently to permit reverse movement.

Any form of fluid under pressure may be utilized to operate the motor 12. The fluid used in the present instance is compressed air. It is introduced into the pressure chamber between the head 16 and the piston 18 by means of a delivery pipe 20. The volume of fluid delivered into the pressure chamber is controlled by a supply valve designated generally by the reference numeral 21. This valve is interposed between the pipe 20 and the main supply line 22. Any suitable valve structure may be used. However, for the purpose of convenience, the valve 21 is illustrated herein as comprising a plunger 22, preferably square in cross section, which is normally held by a spring 23 in a position to shut off the delivery of fluid to the motor. However, when the plunger 22 is pressed inwardly against the compression of said spring 23, an opening 24 in the plunger is brought into register with openings 25 and 26 formed in parts of the valve casing to establish connection between the supply pipe 22 and the delivery pipe 20. When the said piston is pressed inwardly to the position above described, the motor actuating fluid is delivered into the space between the head 16 and the piston 18 of the motor so as to move the motor, against the compression of spring 19, toward the opposite end of the cylinder 15. When it is desired to operate the piston 18 in the reverse direction, the pressure fluid is partially or wholly exhausted from the cylinder 15. In such case the compression of the spring 19 exerted against the piston moves it in the reverse direction. The extent of this reverse movement will depend upon the amount of fluid discharged from the motor. The fluid is discharged from the motor 12 by means of an exhaust valve 21a. This valve is preferably identical with valve 21 and is interposed in the fluid delivery pipe 20 at a location intermediate the valve 21 and the motor 12. In view of the identical constructions of valves 21, 21a the several parts of the exhaust valve are designated by the same reference numerals provided, in each case, with an exponent a. It will be seen, therefore, that when the plunger 22a of the exhaust valve is pressed inwardly to bring the aperture 24a into register with the apertures 25a, 26a, the motor actuating fluid will be discharged into the atmosphere. The amount of fluid discharged in this manner will, of course, depend upon the length of time that the exhaust valve is held in its open position. Consequently, in order to insure a step-by-step operation of the motor in both forward and reverse directions, the valves 21 and 21a are held open only momentarily.

The desired momentary operation of valves 21, 21a is obtained by virtue of a mechanism which is operated independently of the motor 12 to open the valves 21, 21a, but as soon as the motor is operated, its movement functions to release the actuated valve and permits it to return to its closed position. The valve actuating mechanism comprises a lever 27, a heat motor 28 for operating this lever 27, and a self-cycling thermostat 29 for momentarily closing an energizing circuit to supply heat to the heat motor. That is to say, the said circuit is closed momentarily until the temperature of the room reaches a predetermined temperature.

The said lever 27 is pivoted at 30 to the push rod 13 of the motor 12 so that the other end of the lever may be moved into and out of engagement with the plungers 22, 22a of the supply and exhaust valves.

The heat motor includes an outer casing 31 and an inner bellows 32, the latter of which is closed at its inner end by a plate 33. This plate supports a push rod 34 which is connected to the lever 27. The outer end of the bellows is secured to an inturned flange 35 so as to provide a closed chamber between the bellows and the inner surface of the outer casing for containing a quantity of heat sensitive fluid 36. An electrical heating coil 37 is wound around the outer surface of the casing and is adapted, when supplied with electric current, to apply heat. The heat volatilizes the liquid 36 so as to create pressure sufficient to partially compress the bellows 32 and consequently force the push rod 34 and lever 27 in a direction to move the plunger 22 of the valve inwardly. This inward movement of the plunger opens the valve and delivers fluid under pressure into the space between the head 16 and the piston 18 of the fluid motor. The outward movement of piston 18 and push rod 13 functions to impart an adjusting movement to the valve 11 and simultaneously reverses the movement of the lever 27 so as to permit the valve plunger 22 to move to its closed position and consequently stops the movement of the motor 12.

The energization of the heat motor is only momentary until the temperature of the inclosed space reaches the functional setting of the thermostat 29. This character of operation is obtained by virtue of the fact that the thermostat is provided with an electrical auxiliary heater 38 which adds a predetermined amount of heat to the thermostat 29 when the heat motor circuit is open at the thermostat. Consequently, the auxiliary heat tends to cause the mercury column 39 of the thermostat to move upwardly into engagement with the outer contact 40 of the thermostat, thereby bringing about the operation of the heat motor, the actuation of valve 22 and the consequent operation of fluid motor 12 as previously described. However, since the auxiliary heater 38 is connected in the heat motor circuit around the thermostat 29, the closing of the thermostat contacts short circuits the auxiliary heater and permits the thermostat to cool. As soon as the thermostat cools sufficiently to cause its mercury column to recede below the contact 40, the functioning of the heat motor is interrupted and the heat motor is permitted to cool until the thermostat column 39 again engages the outer contact 40. The alternate heating and cooling of the heat motor 28 and the auxiliary heater 38 will continue to effect intermittent operation of the fluid motor 12 and the valve 11 until the temperature reaches the functional setting of the thermostat.

The direction of the adjustment of valve 11 during the outward movement of motor piston 18 will depend upon the character of the temperature-altering means. If this means is utilized to deliver heat into the enclosed space as contemplated in Fig. 1, the adjustments of the valve 11 during the outward movement of piston 18 will be such as to move the valve toward its closed position. However, if the temperature altering means is such as to resist or oppose the rise of the temperature within the enclosed space, the adjusting movements imparted to the valve 11, during the outward movement of piston 18, should be in a direction to open the valve as shown in Fig. 2.

When the valve 11 reaches its closed position in Fig. 1 or its fully open position in Fig. 2, the heat motor will eventually cool so that the bellows 32 will expand sufficiently to move the lever 27 into operation engagement with the plunger 22a of the exhaust valve and thereby bring about the discharge of a portion of the fluid from the motor 12 and thereby permit the spring 19 to move the piston 18 toward the head 16. This reverse movement of the piston 18 imparts a negative adjustment to the valve 11 and a counteracting movement to lever 27. This movement of the lever 27 permits the exhaust valve to close and therefore interrupts the adjusting movement of the fluid motor 12 and valve 11.

Inasmuch as the thermostat 29 responds to the combined effects of the temperature of the enclosed space and the heat supplied by the auxiliary heater 38, the frequency of the cycling action of the thermostat will increase as the temperature of the enclosed space rises to a point near the temperature setting of the thermostat.

I claim:

1. In combination with a fluid pressure reciprocating motor provided with a pair of separately operable fluid supply and exhaust valves for varying the fluid pressure within the motor, of means for selectively actuating one of said valves to effect movement of the motor in a predetermined direction comprising a single lever having direct pivotal engagement with a reciprocating part of the motor, means providing a second pivotal axis for the lever and movable relative to said reciprocating part of the motor, an electrically energized heat motor for shifting said second pivotal axis of the lever relative to the first mentioned pivotal engagement thereof with said reciprocating part of the fluid motor to move another portion of the lever into actuating engagement with one of said valves so as to alter the volume of fluid within said fluid pressure motor, whereby the fluid pressure motor is operated in a direction to move the said lever in an opposite direction about said second pivotal axis to effect a closing of the previously actuated valve, and a temperature responsive device for controlling the energization of said heat motor.

2. In combination with a fluid pressure reciprocating motor provided with a pair of separately operable fluid supply and exhaust valves for varying the fluid pressure within the motor, of means for selectively activating one of said valves to effect movement of the motor in a predetermined direction comprising a single lever having direct pivotal engagement with a reciprocating part of the motor, means providing a second pivotal axis for the lever and movable relative to said reciprocating part of the motor, an electrically energized heat motor for shifting the second pivotal axis of the lever relative to its pivotal engagement with the said reciprocating part of the fluid motor to move the lever into actuating engagement with one of said valves so as to alter the volume of fluid within said motor, whereby the fluid pressure motor is operated in a direction to move the said lever in an opposite direction to effect a closing of the valve, a thermostat responsive to temperature changes at a location remote from said fluid pressure motor for closing and opening an energized circuit for said heat motor, an auxiliary electric heater for the thermostat connected in parallel in the said energizing circuit in advance of the thermostat contacts, whereby the auxiliary heater is energized when the said energizing circuit of the heat motor is opened at the thermostat contacts.

WILLIAM M. SMITH.

REFERENCES CITED

The following references are of record in the file of this patent:

UNITED STATES PATENTS

| Number | Name | Date |
|---|---|---|
| 905,139 | Berge | Dec. 1, 1908 |
| 1,231,257 | Herr | June 26, 1917 |
| 1,378,927 | Witham | May 24, 1927 |
| 1,756,688 | Hutchinson | Apr. 29, 1930 |
| 1,977,538 | Anderson | Oct. 16, 1934 |
| 2,006,658 | Smulski | July 2, 1935 |
| 2,168,599 | Beisel | Aug. 8, 1939 |
| 2,333,066 | Yeida | Oct. 26, 1943 |
| 2,353,692 | Cunningham | July 18, 1944 |
| 2,364,659 | Ray | Dec. 12, 1944 |
| 2,365,223 | Silverstein | Dec. 19, 1944 |
| 2,394,708 | Masek | Feb. 12, 1946 |

FOREIGN PATENTS

| Number | Country | Date |
|---|---|---|
| 55,150 | Denmark | Aug. 15, 1938 |
| 436,557 | Great Britain | Oct. 14, 1935 |